United States Patent
Bacon-Brown et al.

(10) Patent No.: US 12,455,401 B2
(45) Date of Patent: Oct. 28, 2025

(54) METASURFACE WITH OVERCOAT AND EQUAL PILLAR SPACING

(71) Applicant: Moxtek, Inc., Orem, UT (US)

(72) Inventors: Daniel Bacon-Brown, Sandy, UT (US); Bradley R. Williams, Pocatello, ID (US)

(73) Assignee: Moxtek, Inc., Orem, UT (US)

( * ) Notice: Subject to any disclaimer, the term of this patent is extended or adjusted under 35 U.S.C. 154(b) by 507 days.

(21) Appl. No.: 18/112,152

(22) Filed: Feb. 21, 2023

(65) Prior Publication Data

US 2023/0333282 A1    Oct. 19, 2023

Related U.S. Application Data

(60) Provisional application No. 63/332,352, filed on Apr. 19, 2022.

(51) Int. Cl.
    *G02B 1/00*    (2006.01)

(52) U.S. Cl.
    CPC ..................... *G02B 1/002* (2013.01)

(58) Field of Classification Search
    CPC .......... G02B 1/00; G02B 1/002; G02B 1/005; G02B 5/1809
    See application file for complete search history.

(56) References Cited

U.S. PATENT DOCUMENTS

| | | | |
|---|---|---|---|
| 9,404,804 B1 | 8/2016 | Liu et al. | |
| 9,995,859 B2 | 6/2018 | Kamali et al. | |
| 2017/0082263 A1* | 3/2017 | Byrnes | B82Y 20/00 |
| 2019/0086579 A1 | 3/2019 | Kim et al. | |
| 2019/0154877 A1* | 5/2019 | Capasso | G02B 5/18 |
| 2020/0020816 A1* | 1/2020 | Huang | H10F 39/199 |
| 2021/0044748 A1* | 2/2021 | Hu | G02B 13/06 |
| 2021/0405255 A1* | 12/2021 | Kress | G02B 1/002 |
| 2022/0011471 A1* | 1/2022 | Doshay | G02B 3/08 |
| 2022/0146711 A1* | 5/2022 | Greco | G02B 1/002 |
| 2022/0373719 A1* | 11/2022 | Lin | G02B 3/00 |
| 2023/0121211 A1* | 4/2023 | Yang | G02B 1/118 |
| | | | 359/741 |
| 2023/0314247 A1* | 10/2023 | Tanaami | G01L 1/24 |
| | | | 73/862.624 |

FOREIGN PATENT DOCUMENTS

WO    2016168173    10/2016

* cited by examiner

*Primary Examiner* — Ephrem Z Mebrahtu
(74) *Attorney, Agent, or Firm* — Thorpe North & Western, LLP

(57) ABSTRACT

Optical metasurfaces can manipulate a light wavefront without traditional lenses. They can include pillars with sub-wavelength dimensions on a substrate. The pillars can vary in size, shape, and spacing across a surface of the substrate. Each pillar size and shape can diffract incident light and provide a unique electromagnetic response. The metasurface can provide desired light wavefront manipulation without the thickness of traditional lenses. The metasurface can overcome the aberration problem of traditional lenses. An overcoat layer can be located at a distal-end of the pillars. Pillar pitch can be adjusted for uniform spacing between pillars, and uniform overcoat coverage. The overcoat layer can protect the pillars. An alternative to the overcoat layer is a solid fill-material filling gaps between the pillars.

20 Claims, 3 Drawing Sheets

METASURFACE WITH OVERCOAT AND EQUAL PILLAR SPACING

CLAIM OF PRIORITY

This application claims priority to U.S. Provisional Patent Application No. 63/332,352, filed on Apr. 19, 2022, which is incorporated herein by reference.

FIELD OF THE INVENTION

The present application is related to optical metasurfaces.

BACKGROUND

Optical metasurfaces can manipulate a light wavefront without traditional lenses. They can include structures, such as pillars, ribs, or holes with subwavelength dimensions, on or in a substrate.

The structures can vary in size, shape, and spacing across a surface of the substrate. Each structure size, shape and spacing can provide a unique electromagnetic response. The metasurface can provide desired light wavefront manipulation (phase, polarization & amplitude) without the thickness of traditional lenses. The metasurface can overcome the aberration problem of traditional lenses.

The metasurface structures, which can be comparable in size to the light wavelength, can diffract incident light. The structures can have nanometer-sized dimensions. Instead of relying on curvature, like traditional lenses, metasurfaces rely on the dimensions and pattern of the structures to diffract the light in desirable patterns. The diffracted light waves can interfere with one another, forming the desired, altered wavefront.

The metasurface can focus the light, collimate light, diffract light, diffuse light, change the polarization of light, or split white light into multiple, different colors. Metasurfaces can be used for miniaturizing and improving the quality of optical systems. Metasurfaces can reduce the number of optical components in a system. Metasurfaces can be adaptable to solve a broader variety of needs than traditional lenses. Metasurfaces can be used for detecting light intensity, depth-sensing, imaging, light dependent electronics, microspectrographs, security, and cryptography.

BRIEF DESCRIPTION OF THE DRAWINGS (DRAWINGS MIGHT NOT BE DRAWN TO SCALE)

Figure 1:
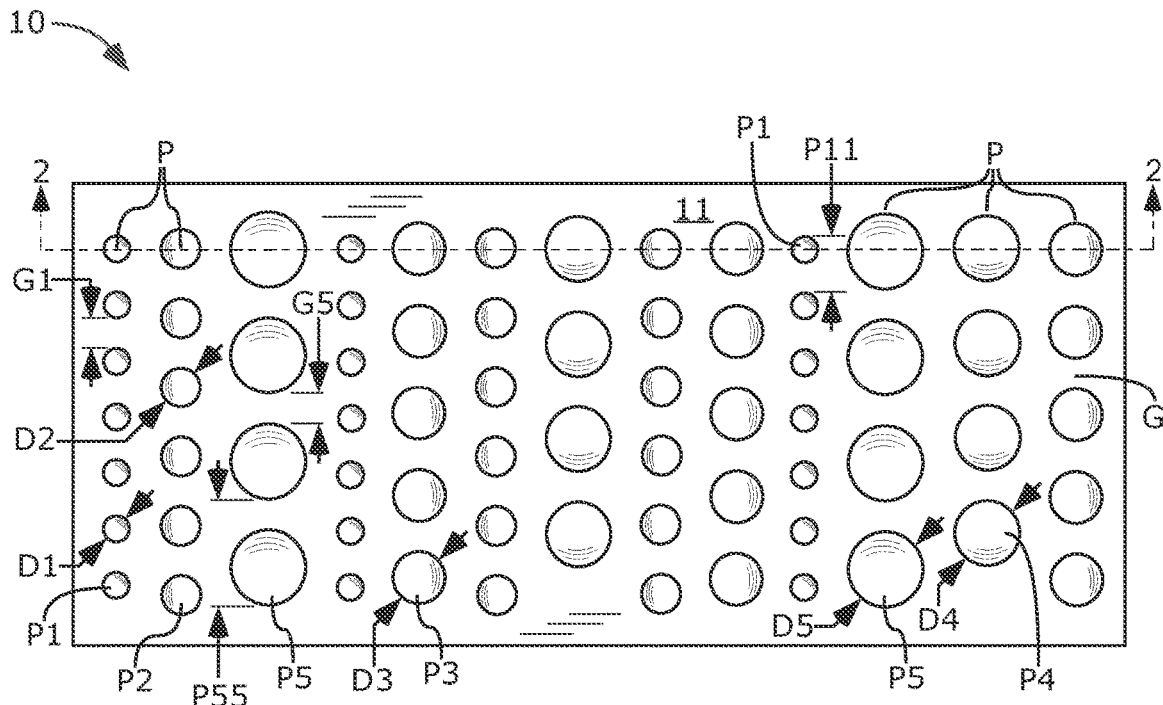

FIG. 1 is a top-view of a metasurface optical device 10 with an array of pillars P on a substrate 11. The pillars P can have different diameters with respect to each other. Gaps G between proximate pillars P can be uniform. Pitch can vary.

Figure 2:
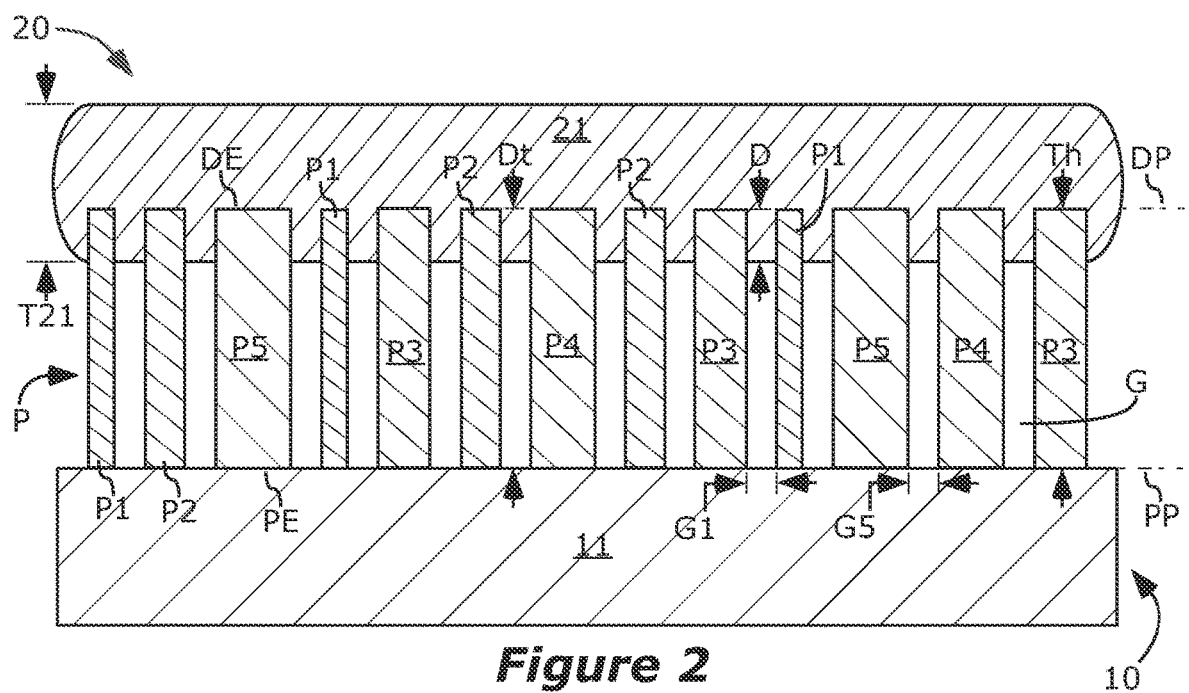

FIG. 2 is a cross-sectional side-view of a metasurface optical device 20, including an overcoat layer 21 on the metasurface optical device 10. The cross-sectional side-view of the metasurface optical device 10 is taken along line 2-2 in FIG. 1.

Figure 3:
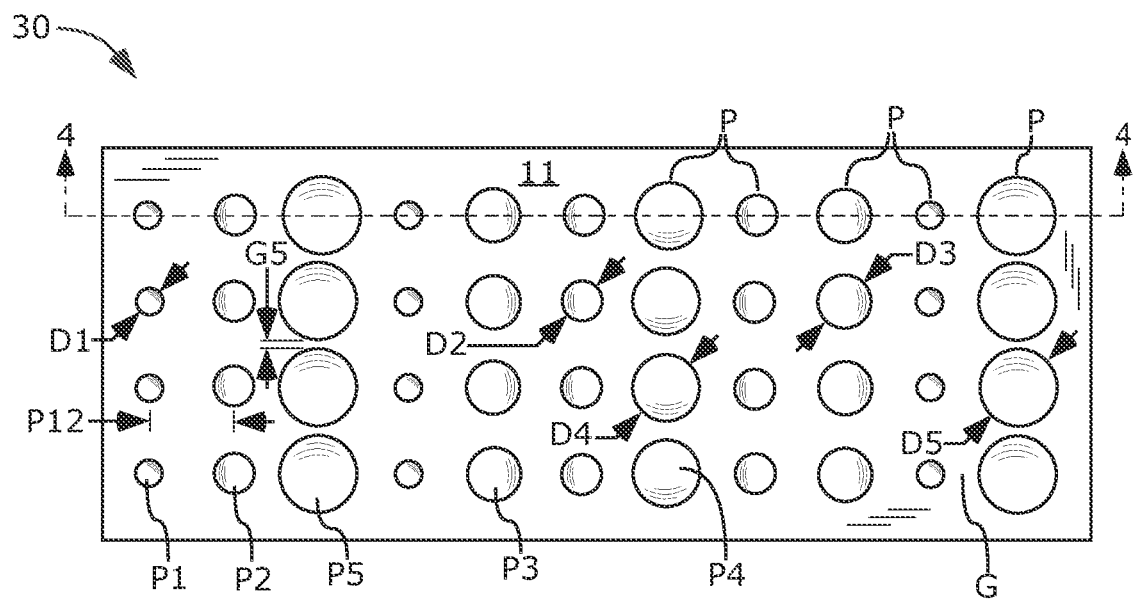

FIG. 3 is a top-view of a metasurface optical device 30 with an array of pillars P on a substrate 11. The pillars P can have different diameters with respect to each other. Pitch between adjacent pillars P can be uniform. Gap size can vary.

Figure 4:
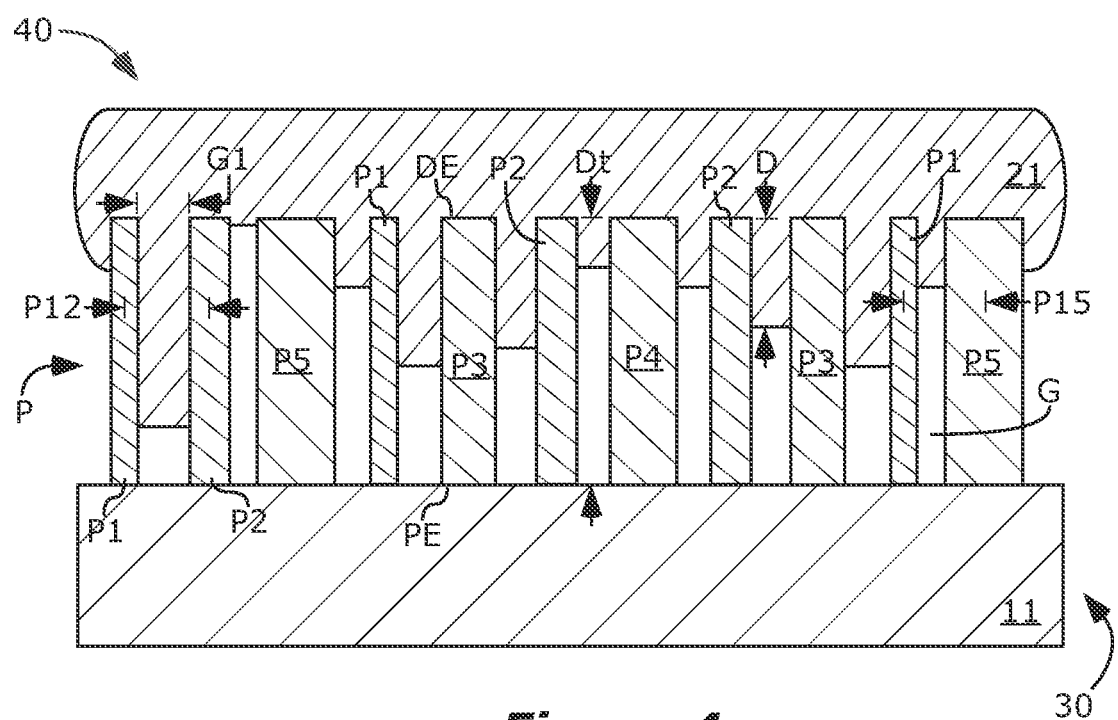

FIG. 4 is a cross-sectional side-view of a metasurface optical device 40, including an overcoat layer 21 on the metasurface optical device 30. The cross-sectional side-view of the metasurface optical device 30 is taken along line 4-4 in FIG. 3.

Figure 5:
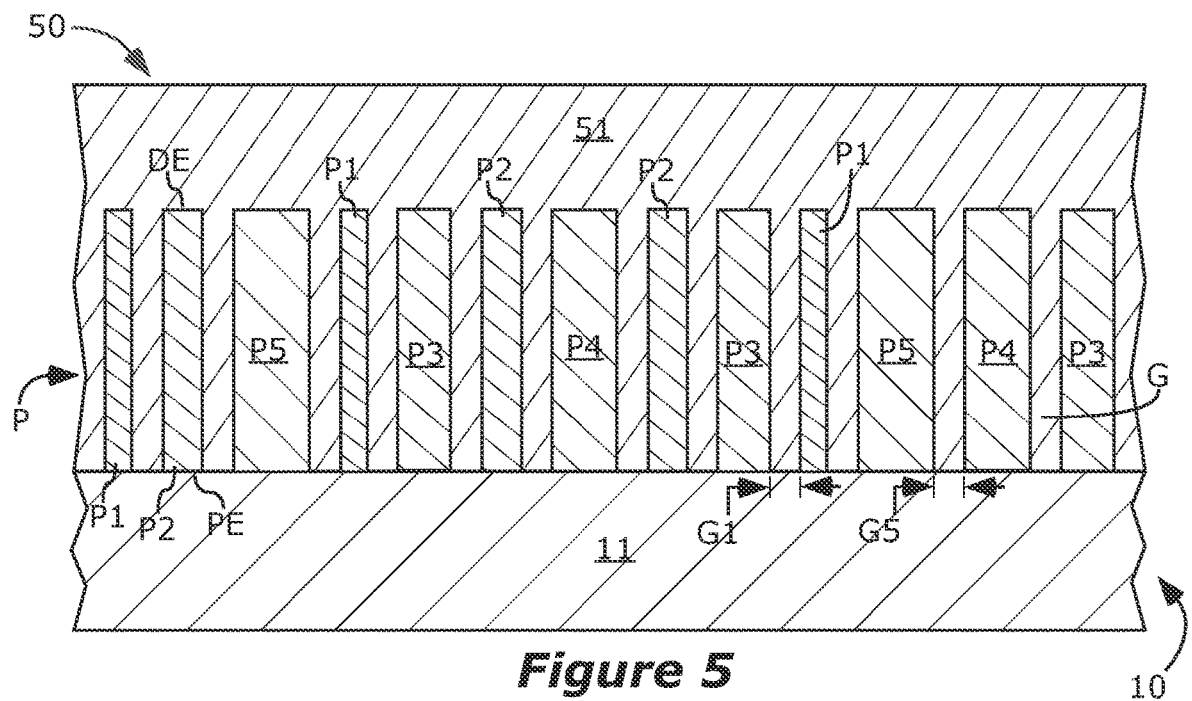

FIG. 5 is a cross-sectional side-view of a metasurface optical device 50, including a fill-material 51 filling gaps G between the pillars P of the metasurface optical device 10. The cross-sectional side-view of the metasurface optical device 10 is taken along line 2-2 in FIG. 1.

Figure 6:
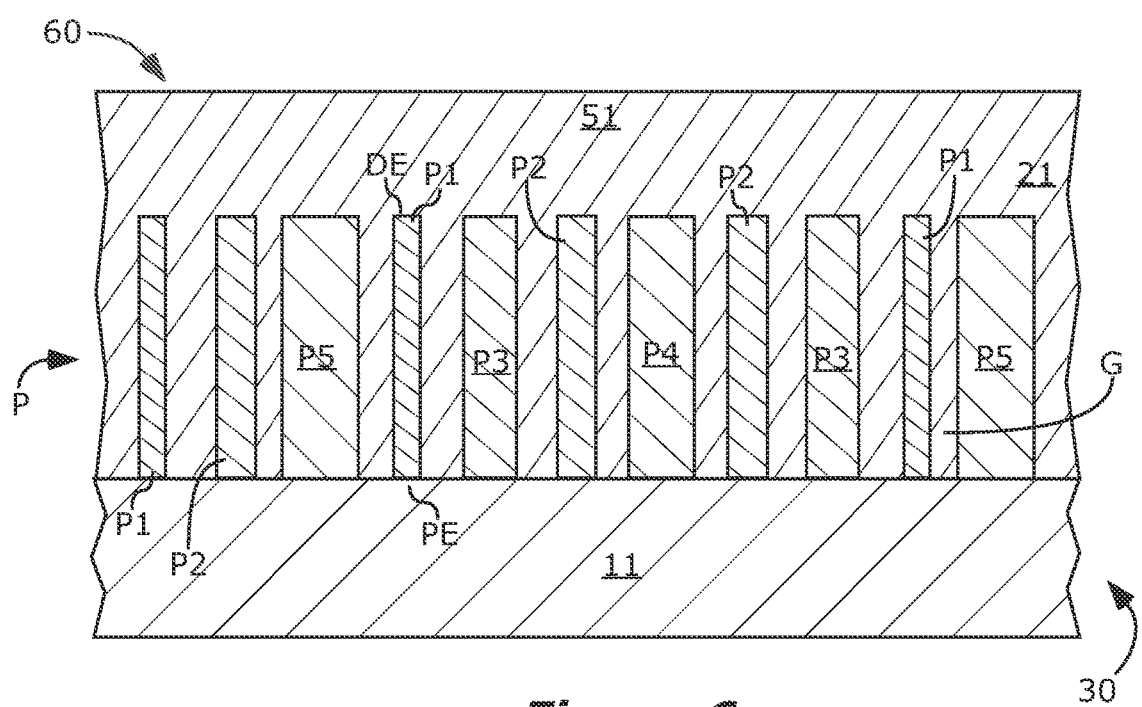

FIG. 6 is a cross-sectional side-view of a metasurface optical device 60, including a fill-material 51 filling most of the gaps G between the pillars P of the metasurface optical device 30. The cross-sectional side-view of the metasurface optical device 30 is taken along line 4-4 in FIG. 3.

REFERENCE NUMBERS IN THE DRAWINGS metasurface optical device 10, 20, 30, 40, 50, and 60
substrate 11
overcoat 21
fill-material 51
distance D of overcoat 21 extension down sidewalls
distal-end DE
distal-plane DP
gap G
gap G1 between the smallest diameter pillar P1 and a nearest adjacent pillar P
gap G5 between the largest diameter pillar P5 and a nearest adjacent pillar P
pillar P
pillars P1, P2, P3, P4, and P5 with diameters D1, D2, D3, D4, and D5, respectively
pitch P11 between two of the smallest pillars P1
pitch P12 between pillar P1 and proximate pillar P2
pitch P15 between pillar P1 and proximate pillar P5
pitch P55 between two of the largest pillars P5
proximal-end PE
proximal-plane PP
thickness Th of the pillar P
thickness T21 of the overcoat 21

Definitions

The following definitions, including plurals of the same, apply throughout this patent application.

As used herein, the phrase "spaced equally" means spaced exactly equal; spaced equal within normal manufacturing tolerances; or spaced almost exactly equal, such that any deviation from spaced exactly equal would have negligible effect for ordinary use of the device.

As used herein, uniform gap means exactly uniform; uniform within normal manufacturing tolerances; or almost exactly uniform, such that any deviation from exactly uniform would have negligible effect for ordinary use of the device.

As used herein, the terms "on", "located on", "located at", and "located over" mean located directly on or located over with some other solid material between. The terms "located directly on", "adjoin", "adjoins", and "adjoining" mean direct and immediate contact.

DETAILED DESCRIPTION

As illustrated in FIGS. 1-6, metasurface optical devices 10, 20, 30, 40, 50, and 60 comprise an array of pillars P on a substrate 11. Comparative advantages between these different devices is summarized in the following two paragraphs, followed by details of their construction.

Metasurface optical devices 10 and 20 are preferred over optical devices 30 and 40, because optical devices 10 and 20 have variable pitch in order to achieve more uniform gaps G between the pillars P. Consequently, the overcoat 21 can extend a consistent distance down sidewalls of the pillars P in metasurface optical device 20.

Metasurface optical device 50 is preferred over metasurface optical device 60, because metasurface optical device 50 has variable pitch in order to achieve more uniform gaps G between the pillars P. This can result in more uniform filling of the gaps G between the pillars P of metasurface optical device 50 with a solid fill-material 51. Note that metasurface optical device 60 can have undesirable air pockets in between closer-spaced pillars P.

Each pillar P can have a proximal-end PE nearest the substrate 11 and a distal-end DE farthest from the substrate 11. As illustrated in FIG. 2, the pillars P can have a uniform thickness Th across the array, measured between the proximal-end PE and the distal-end DE. The proximal-end PE of the pillars P can be located in a proximal-plane PP and the distal-end DE of the pillars P can be located in a distal-plane DP.

The array of pillars P can include different pillars P with different diameters with respect to each other. Five different pillars P1, P2, P3, P4, and P5 are illustrated, with different diameters D1, D2, D3, D4, and D5 respectively. The invention can include any number of different pillars P with different diameters. For example, there can be $\geq 2$, $\geq 3$, $\geq 4$, or $\geq 5$ different pillars P with different diameters with respect to each other. The pillars P of different diameters can interact with incident light to provide a unique electromagnetic response, such as light collimation, imaging, light aberration correction, and focusing separately each polarization of light.

The different diameters can be substantially different with respect to each other to achieve the desired optical effect. Following are example relationships between a diameter D5 of a largest diameter pillar P5 and a diameter D1 of a smallest diameter pillar P1 to achieve the aforementioned purposes: $D5/D1 \geq 1.5$ $D5/D1 \geq 2$, $D5/D1 \geq 3$, or $D5/D1 \geq 4$: and $D5/D1 \leq 6$, $D5/D1 \leq 10$, or $D5/D1 \leq 25$. Each application and wavelength range will have different pillar P relationships. Both diameters D5 and D1 are measured halfway between the proximal-end PE and the distal-end DE. If the pillars P are not circular (parallel to a face of the substrate 11), then the diameters are the smallest distance from one edge of the pillar P to the opposite edge of the pillar P.

As illustrated in FIGS. 2 and 4, a solid overcoat layer 21 can be located at the distal-end DE of the pillars P. The overcoat 21 can span gaps G between the pillars P. The overcoat 21 can be transparent across the ultraviolet light spectrum, the visible light spectrum, the infrared light spectrum, or combinations thereof. The overcoat 21 can protect the pillars P.

The overcoat 21 can be formed by sputter deposition. Due to the small gaps G, only a negligible amount of the overcoat 21, or none of the overcoat 21, can reach the substrate 11 between the pillars P.

The overcoat 21 can extend part-way down sidewalls of the pillars P. For example, the overcoat 21 can extend down the sidewalls of the pillars P for a distance D that is $\geq 5\%$, $\geq 10\%$, $\geq 25\%$, $\geq 50\%$, or $\geq 75\%$ of the thickness Th of the pillars P. As another example, the overcoat 21 can extend down sidewalls of the pillars P for a distance D that is $\leq 25\%$, $\leq 50\%$, $\leq 75\%$, or $\leq 90\%$ of the thickness Th of the pillars P. The distance D that the overcoat 21 extends down sidewalls of the pillars P of the metasurface optical device 20 is about 20% of the thickness Th of the pillars P, with negligible variation.

A disadvantage of the metasurface optical device 40 is that there can be substantial variation in the distance D that the overcoat 21 extends down sidewalls of the pillars P. This is a result of the uniform pitch and variable sized gap G in metasurface optical device 30. This large variation in distance D of overcoat 21 on the sidewalls can result in variations in the index of refraction in the gaps G across the device. These variations can interfere with the desired optical effect.

On metasurface optical device 40, an average of the distance D of overcoat 21 extension down sidewalls of the pillars P is 38% of the thickness Th of the pillars P. Variation of the distance D of overcoat 21 extension down sidewalls of the pillars P is from 3% to 78%.

In contrast, there is negligible variation in the distance D that the overcoat 21 extends down sidewalls of the pillars P of metasurface optical device 20. This negligible variation in overcoat 21 on sidewalls results in consistent proportion of overcoat filling in the gaps G across the device. This can better achieve the desired optical effect.

The negligible variation in the distance D is a result of the uniform sized gap G and variable pitch in metasurface optical device 10. Thus, in optical devices 10 and 20, the array of pillars P are uniform with regard to the gap G between each pillar P and a nearest adjacent pillar P (i.e. closest proximate pillar P).

Thus, by designing uniform sized gap G, the overcoat 21 can extend a consistent distance down sidewalls of the pillars P. For example, variation of this distance across the device, of the overcoat 21 down the sidewalls, can be +/−3%, +/−5%, +/−10%, or +/−15% from an average of the distance D of the overcoat 21 down the sidewalls.

Therefore, metasurface optical device 10, with the pillars P spaced equally with respect to each other, is preferred. The benefit of minimal variation in the distance D that the overcoat 21 extends down sidewalls of the pillars P can be achieved, however, with some small variation in pillar P spacing.

Following are example gap G relationships for achieving this minimal variation of distance D: $G1/G5 \leq 1.2$, $G1/G5 \leq 1.5$, $G1/G5 \leq 2$, or $G1/G5 \leq 5$; and $G5/G1 \leq 1.2$, $G5/G1 \leq 1.5$, $G5/G1 \leq 2$, or $G5/G1 \leq 5$. G1 is a gap between the smallest diameter pillar P1 and a nearest adjacent pillar P to it. G5 is a gap between the largest diameter pillar P5 and a nearest adjacent pillar P to it. G1 and G5 are measured as a smallest straight-line path to a nearest adjacent pillar at a midpoint between the proximal-end PE and the distal-end DE. For metasurface optical devices 10 and 20, G1/G5 is approximately equal to one. For metasurface optical devices 30 and 40, G1/G5 is approximately equal to fifteen.

Reduced variation in distance D that the overcoat 21 coats the sidewalls can be achieved by adjusting the pitch between pillars P.

The pitch between pillars P in metasurface optical devices 30 and 40 is approximately equal. For example, the pitch P12 between pillar P1 and proximate pillar P2 is about the same as the pitch P15 between pillar P1 and proximate pillar P5. Metasurface optical device 40 has the disadvantage of variable overcoat 21 distance D down the sidewalls, as a result of its uniform pitch, variable gap G.

In contrast, in metasurface optical devices 10 and 20, the pitch varies to achieve consistent overcoat 21 distance D down the sidewalls. A pitch between adjacent, smaller pillars P is less than a pitch between adjacent, larger pillars P. For example, P55/P11=1.9, where P55 is a pitch between two of the largest pillars P5, and P11 is a pitch between two of the smallest pillars P1. Thus, a pitch between two of the largest pillars P55 can be at least 1.2, at least 1.5, or at least 2 times larger than a pitch between two of the smallest pillars P1.

As illustrated in FIGS. 5-6, metasurface optical devices 50 and 60 can include a fill-material 51 between the pillars P, which can fill gaps G between the pillars P. The fill-material 51 can be transparent in a wavelength range of intended use, such as across the ultraviolet spectrum, across the visible spectrum, across the infrared spectrum, or combinations thereof. This fill-material 51 can provide better protection for the pillars P than the overcoat 21; but the fill-material 51 can hurt performance of the device compared to the overcoat 21.

Metasurface optical device 50 is preferred over metasurface optical device 60. Metasurface optical device 50 has equal spacing between pillars P. This can result in more uniform filling of the gaps G between pillars P. The gaps G can be completely filled with the fill-material 51. Characteristics of pillar P spacing described above for metasurface optical device 20 can be used for metasurface optical device 50.

Metasurface optical device 60 has equal pitch between proximate pillars P, but unequal gaps G. Consequently, there can be air gaps/voids with missing fill-material 51. The reason is that it is difficult to adjust application of the fill-material 51 to fill wide and narrow gaps G.

This paragraph includes example dimensions for components of the metasurface optical devices described herein. Each pillar P can have a thickness Th that is ≥100 nm and ≤2 µm (see FIG. 2). Each pillar P can have a diameter D1, D2, D3, D4, or D5 that is ≥25 nm and ≤750 nm (see FIGS. 1 and 3). A pitch P11, P12, P15, or P55 of adjacent pillars P can be ≥75 nm and ≤2 µm (see FIGS. 1 and 4). The overcoat 21 can have a thickness T21 that is ≥50 nm and ≤750 nm (see FIG. 2). The thicknesses Th and T21 are measured perpendicular to the substrate 11.

This paragraph includes example materials for components of the metasurface optical devices described herein. The substrate 11 can comprise glass, silicon, or both for a transparent metasurface optical device. The substrate 11 can be metallic for a reflective metasurface optical device. For example, the substrate 11 can comprise aluminum. The pillars P can be made of the same material as the substrate, or can be made of different materials. The pillars P are typically transparent in the wavelength range of use. The pillars P can comprise niobium oxide, silicon, glass, silicon nitride, titanium oxide, or combinations thereof. The overcoat 21 is typically transparent in the wavelength range of use. The overcoat 21 can comprise silicon dioxide.

What is claimed is:

1. A metasurface optical device comprising:
an array of pillars on a substrate, including different pillars with different diameters with respect to each other;
each pillar has a proximal-end nearest the substrate and a distal-end farthest from the substrate;
D5/D1≥2, where D5 is a diameter of a largest diameter pillar and D1 is a diameter of a smallest diameter pillar, both diameters D5 and D1 measured halfway between the proximal-end and the distal-end;
G1/G5≤1.5, where G1 is a gap between the smallest diameter pillar and a nearest adjacent pillar of the array, and G5 is a gap between the largest diameter pillar and a nearest adjacent pillar of the array, both gaps G1 and G5 measured halfway between the proximal-end and the distal-end;
P55/P11≥1.5, where P55 is a pitch between two of the largest pillars and P11 is a pitch between two of the smallest pillars, proximate to each other; and
an overcoat layer located at the distal-end of the pillars, the overcoat layer spanning gaps between the pillars.

2. The device of claim 1, wherein D5/D1≥3 and G1/G5≤1.2.

3. The device of claim 1, wherein a pitch between adjacent, smaller pillars is less than a pitch between adjacent, larger pillars.

4. The device of claim 1, wherein a pitch between proximate pillars throughout the array is not uniform.

5. The device of claim 1, wherein the overcoat extends down sidewalls of the pillars for a distance of ≥5% and ≤90% from the distal-end towards the proximal-end.

6. The device of claim 1, wherein the overcoat extends down sidewalls of the pillars, and variation of a distance of the overcoat extending down the sidewalls across the device is +/−10% from an average distance.

7. The device of claim 1, wherein the proximal-end of the pillars are located in a proximal-plane and the distal-end of the pillars are located in a distal-plane.

8. The device of claim 1, wherein the overcoat extends down sidewalls of the pillars for a distance of ≤90% from the distal-end towards the proximal-end.

9. The device of claim 1, wherein:
the pillars have a uniform thickness;
the thickness is measured perpendicular to the substrate; and
the thickness is ≥100 nm and ≤2 µm.

10. A metasurface optical device comprising:
an array of pillars on a substrate, including different pillars with different diameters with respect to each other;
each pillar has a proximal-end nearest the substrate and a distal-end farthest from the substrate;
D5/D1≥2, where D5 is a diameter of a largest diameter pillar and D1 is a diameter of a smallest diameter pillar, both diameters D5 and D1 measured halfway between the proximal-end and the distal-end;
a pitch between the smallest diameter pillar and a nearest adjacent pillar of the array is less than a pitch between the largest diameter pillar and a nearest adjacent pillar of the array; and
gaps between proximate pillars are uniform; and
an overcoat layer located at the distal-end of the pillars, the overcoat layer spanning gaps between the pillars.

11. The device of claim 10, wherein the overcoat extends down sidewalls of the pillars, and variation of a distance of the overcoat extending down the sidewalls across the device is +/−10% from an average distance.

12. The device of claim 10, wherein the different pillars with different diameters include at least five different pillars with different diameters with respect to each other.

13. The device of claim 10, wherein the pillars are transparent across the visible light spectrum.

14. The device of claim 10, wherein:
each pillar has a thickness measured perpendicular to the substrate that is ≥100 nm and ≤2 µm;
each pillar has a diameter that is ≥25 nm and ≤750 nm;
a pitch of adjacent pillars is ≥75 nm and ≤2 µm; and
the overcoat has a thickness measured perpendicular to the substrate that is ≥50 nm and ≤750 nm.

15. The device of claim 10, wherein the gaps are air-filled.

16. The device of claim 10, wherein the pillars have a uniform thickness.

17. The device of claim 10, wherein $D5/D1 \geq 3$.

18. The device of claim 10, wherein the overcoat extends down sidewalls of the pillars for a distance of $\geq 5\%$ and $\leq 90\%$ from the distal-end towards the proximal-end.

19. The device of claim 10, wherein the overcoat extends down sidewalls of the pillars for a distance of $\leq 90\%$ from the distal-end towards the proximal-end.

20. The device of claim 10, wherein the proximal-end of the pillars are located in a proximal-plane and the distal-end of the pillars are located in a distal-plane.

* * * * *